Dec. 19, 1961 P. M. THOMPSON ET AL 3,013,724

ANALOGUE MULTIPLIER

Filed Jan. 19, 1959 4 Sheets-Sheet 1

INVENTOR
PHILIP M. THOMPSON
ROBERT J. BIBBY
BY – Smart & Biggar.
ATTORNEYS

INVENTOR
PHILIP M. THOMPSON
ROBERT J. BIBBY
BY- Smart & Biggar.
ATTORNEYS

INVENTOR
PHILIP M. THOMPSON
ROBERT J. BIBBY
BY– Smart & Biggar
ATTORNEYS

INVENTOR
PHILIP M. THOMPSON
ROBERT J. BIBBY
BY– Smart & Biggar
ATTORNEYS

United States Patent Office 3,013,724

Patented Dec. 19, 1961

3,013,724

ANALOGUE MULTIPLIER

Philip M. Thompson and Robert John Bibby, Cumberland, Ontario, Canada, assignors to Her Majesty the Queen in right of Canada as represented by the Minister of National Defence Filed Jan. 19, 1959, Ser. No. 787,667
Claims priority, application Canada Dec. 11, 1958
2 Claims. (Cl. 235—194)

The invention relates to analogue multipliers and, in particular, is concerned with an analogue multiplier using electronic circuits for the multiplication of functions simulated by electric signals.

Prior to the invention both electro-mechanical and fully electronic analogue multipliers have been available but each type has had serious disadvantages. In the case of electro-mechanical type analogue multipliers mechanical limitations have prevented high speed operation. When high speed operation is required it is necessary to use electronic circuits but known high speed electronic circuits have been dependent upon the non-linear characteristics of amplifying devices making it necessary to determine accurately these non-linear characteristics and, even in the case of using selected high stability components, the circuits required frequent adjustment. The result was that the fully electronic equipment was unsuited to the usual production methods and was built only at high cost. Also the requirement for frequent adjustments to the equipment made it unsuitable for many applications.

The present invention provides an electronic high speed analogue multiplier which requires neither precise adjustments nor the selection of high stability components. An analogue multiplier, in accordance with the invention, uses a phase-sensitive detector having the property that the output is proportional to the product of the phase difference between the electric signals at its input connections and the amplitude of one of the electric signals. In accordance with the invention this property is used to perform multiplication of a multiplicand analogue electric input signal and a multiplier analogue electric input signal to produce a product analogue electric output signal. The apparatus according to the invention comprises a source of carrier signal, a phase modulator adapted to phase-modulate the carrier signal according to variations of the multiplicand analogue electric input signal, and a suppressed-carrier amplitude modulator adapted to amplitude modulate the carrier signal according to variations of the multiplier analogue electric input signal. The modulated signals from the phase-modulator and from the amplitude-modulator are supplied as the input signals to a phase-sensitive detector, which is adapted to provide at its output connections an electric signal having a predetermined relationship to the product of the phase difference between the electric input signals and the amplitude of one of the electric input signals thereby providing the analogue electric output signal.

The invention provides a four-quadrant multiplier of a good linearity which uses semi-conductor devices to provide a reliable multiplier requiring a minimum of attention during use.

The invention will be described further with reference to the accompanying drawings in which:

FIGURES 5*a* and 5*b* together are a schematic wiring diagram of a multiplier in accordance with the invention and as shown in FIGURE 4.

Figure 1:
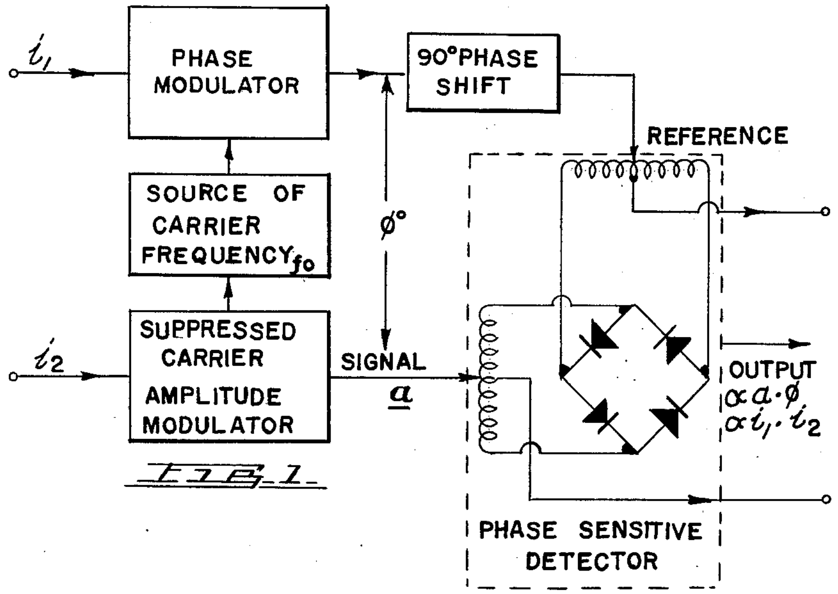
FIGURE 1 is a block diagram illustrating the method of multiplication in accordance with the invention.

A multiplier in accordance with the invention and as shown in the drawings, is adapted to multiply a current $i_1$ by a current $i_2$ to provide an output current equal to $\alpha i_1 . i_2$ where $\alpha$ is a constant. The currents $i_1$ and $i_2$ simulate analogue functions and the use of such electric signals in multipliers is well known in the art. As shown in FIGURE 1, the two input currents $i_1$ and $i_2$, respectively, phase- and suppressed-carrier amplitude-modulate a square wave carrier signal of frequency $f_0$. The suppressed-carrier amplitude-modulated carrier signal and the phase-modulated carrier signal are the signal and reference inputs of a phase-sensitive detector, shown in FIGURE 1 as a conventional diode ring. As indicated in FIGURE 1, the signal input of the phase-sensitive detector is a signal of amplitude $a$, and the phase-difference between the signal and reference waveforms before a 90° phase shift is $\phi$ degrees. In accordance with the known properties of a phase sensitive detector, under these circumstances, the output signal has a value proportional to $a.\phi$. Because $a$ is determined by the input current $i_2$ and $\phi$ is determined by the input current $i_1$, the output current of the phase-sensitive detector is proportional to $i_1 . i_2$, which is the product analogue electric signal obtained from the multiplication of the multiplicand analogue electric signal $i_1$ by the multiplier analogue electric signal $i_2$. The phase-modulated signal is shifted in phase by 90° and the modulators are suppressed-carrier modulators with the result that the output current is zero when either input current is zero.

Figure 2:
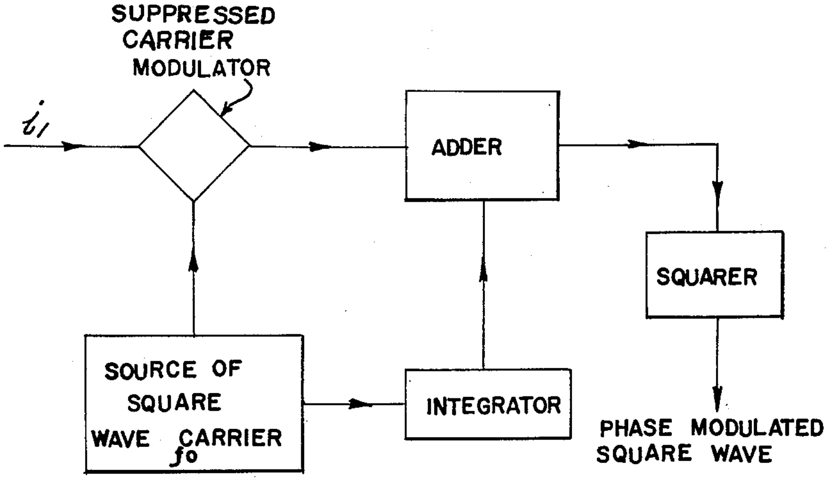
FIGURE 2 is a block diagram illustrating the method by which phase-modulation is obtained.

In the phase modulator shown in block form in FIGURE 2, the input signal $i_1$ is used to amplitude-modulate the square wave carrier signal $f_0$ in a suppressed-carrier modulator and the suppressed-carrier amplitude-modulated square wave is supplied as one of the inputs to an adder. The other input of the adder is a triangular wave obtained from an integrator which integrates the square wave carrier $f_0$. In this way, the output of the suppressed-carrier amplitude modulator is added to the triangular wave and this is illustrated graphically in FIGURE 3, where Curve (*a*) is the square wave carrier $f_0$;
Curve (*b*) is the triangular wave from the integrator;
Curve (*c*) is the suppressed-carrier amplitude-modulated square wave; and
Curve (*d*) is the combined waveform obtained when the waveforms (*b*) and (*c*) are added.

Figure 3:
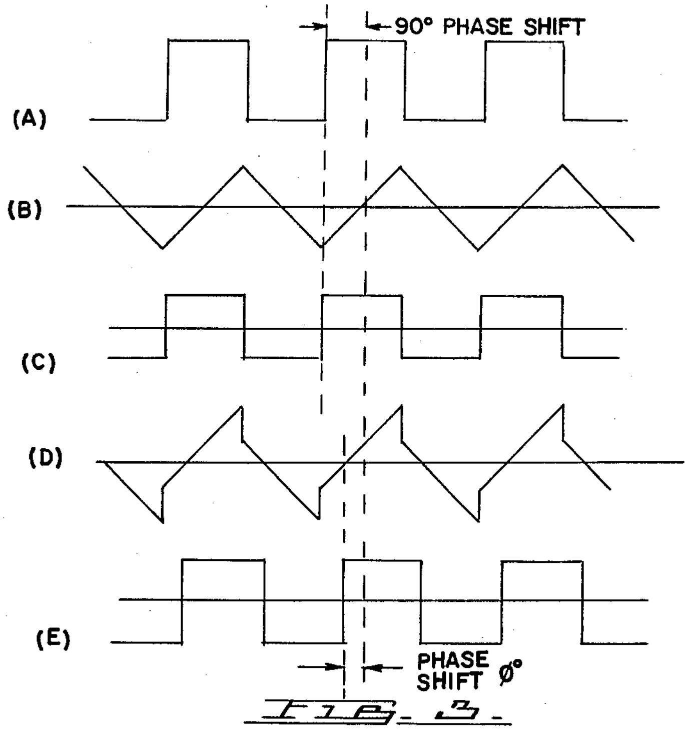
FIGURE 3 shows the waveforms associated with the apparatus shown in FIGURE 2.

The zero crossings of the combined waveform (*d*), define the edges of the output square wave which is obtained through the squarer (FIGURE 2) and which is the phase-modulated square wave shown as curve (*e*) in FIGURE 3.

Figure 4:
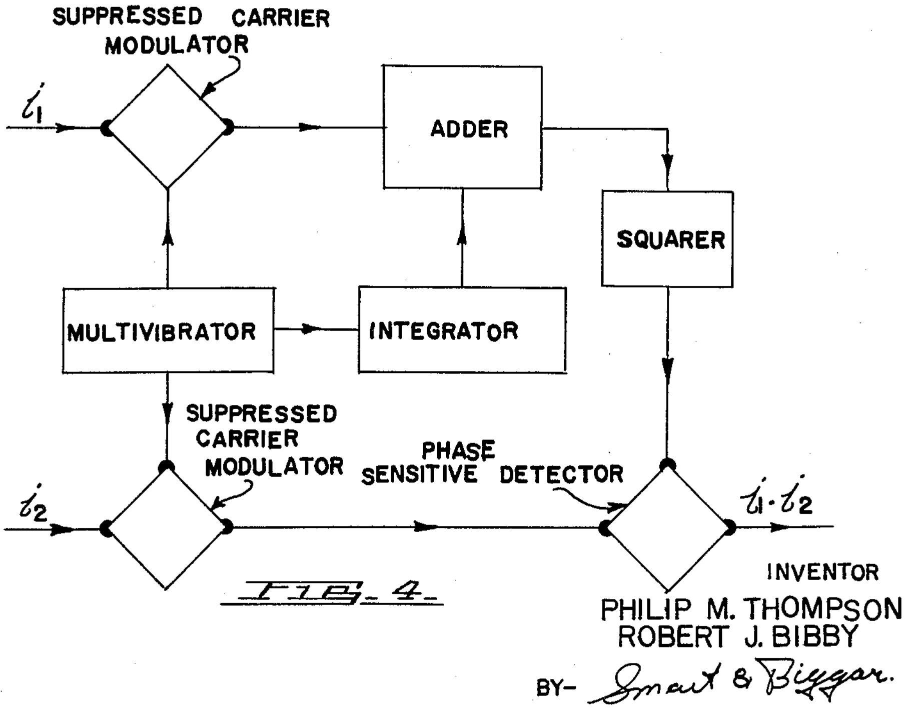
FIGURE 4 is a block diagram of a multiplier in accordance with the invention.

FIGURE 4 shows a complete block diagram for the multiplier. The multiplier comprises two suppressed-carrier amplitude modulators having input currents $i_1$ and $i_2$. The carrier frequency supplied to the two suppressed-carrier modulators is obtained from a multivibrator, which also supplies a signal of carrier frequency through an integrator to the adder. The adder, the integrator and the squarer perform the same functions to obtain the phase-modulation as described above in connection with FIGURE 2. The suppressed-carrier phase-modulated signal and the suppressed-carrier amplitude-modulated signal are supplied to a phase-sensitive detector as the reference and signal inputs, and the signal obtained at the output of the phase-sensitive detector is proportional to $i_1 . i_2$.

Figure 5A:
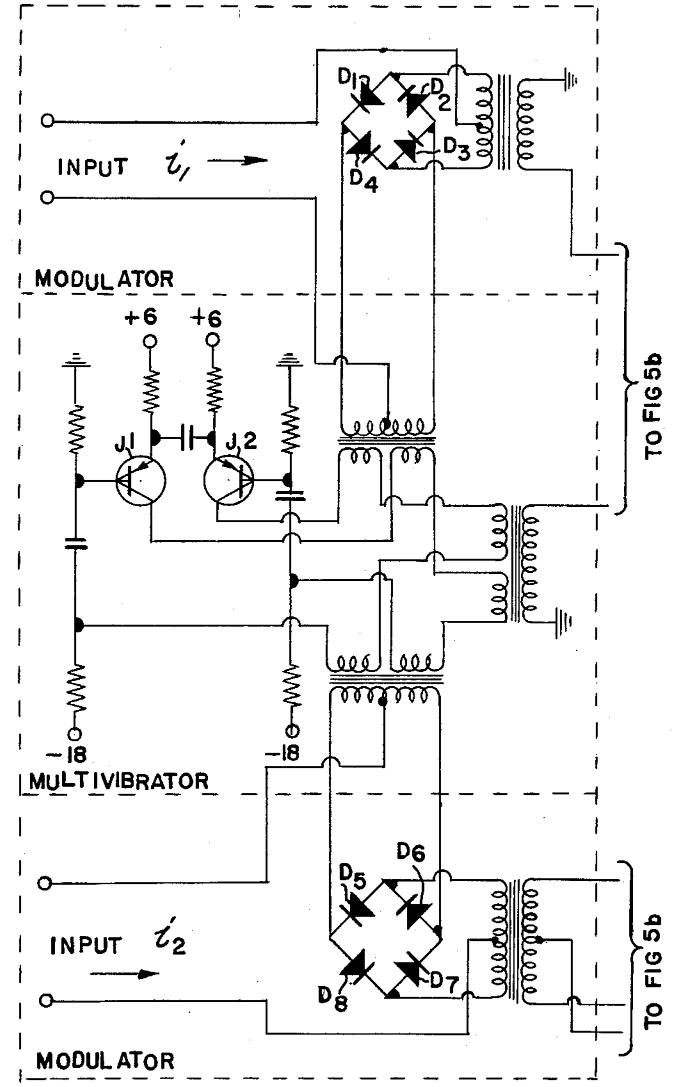
Figure 8B:
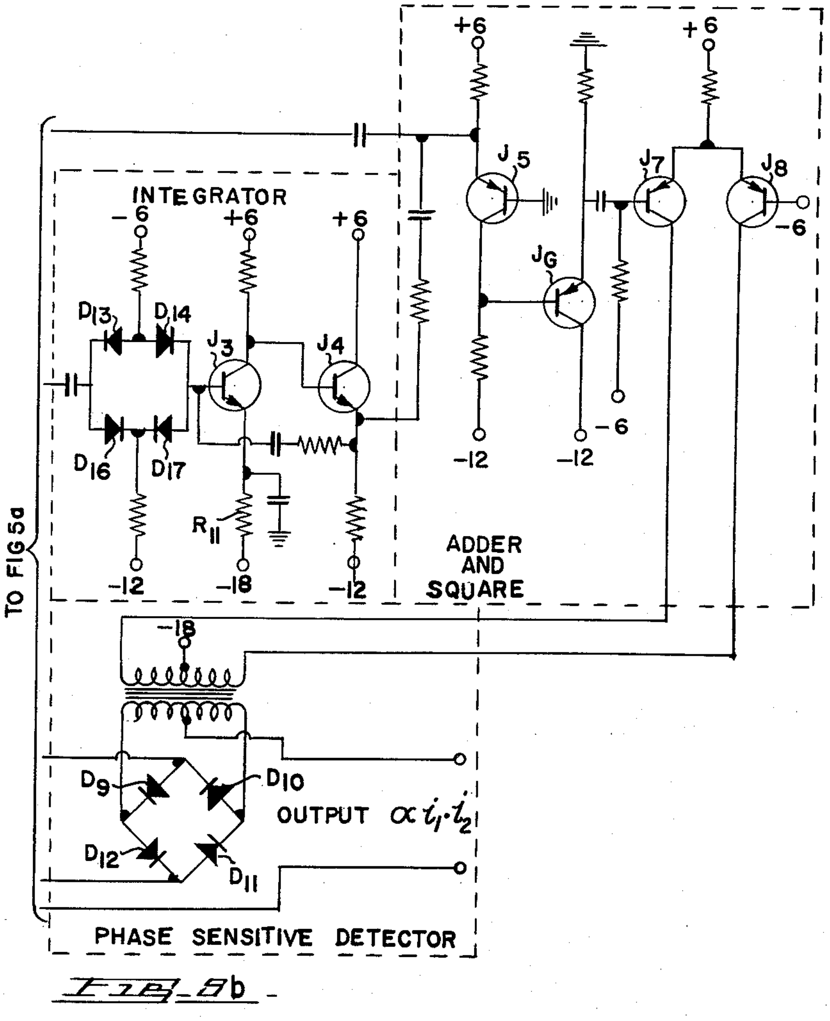

FIGURES 5*a* and 5*b* together show a complete schematic wiring diagram of the multiplier which is shown in block form in FIGURE 4. The method of designing each unit of the complete multiplier is based on standard design procedures and therefore will not be dealt with in detail. As shown in FIGURE 5*a*, the input current $i_1$ is supplied to a suppressed-carrier modulator comprising a diode ring $D_1$, $D_2$, $D_3$, $D_4$. The input current $i_2$ is supplied to a similar suppressed-carrier modulator comprising a diode ring $D_5$, $D_6$, $D_7$, $D_8$. The source of square wave carrier signal is a multi-vibrator comprising transistors $J_1$ and $J_2$ and associated circuits. Square wave carrier signal from the multi-vibrator is also supplied to an integrator comprising a diode ring $D_{13}$, $D_{14}$, $D_{16}$, $D_{17}$ and transistors $J_3$ and $J_4$ with associated circuits. Carrier signal suppressed-carrier amplitude-modulated by the input current $i_1$ and triangular wave signal from the integrator are supplied to the adder and squarer which comprises the transistors $J_5$, $J_6$, $J_7$ and $J_8$ and associated circuits. The phase-modulated output square wave signal from the adder and squarer is supplied as the reference input to the phase-sensitive detector comprising the diode ring $D_9$, $D_{10}$, $D_{11}$, $D_{12}$. The signal input to this phase-sensitive detector is the carrier signal which has been suppressed-carrier amplitude-modulated by the input current $i_2$. The output current of the phase-sensitive detector is proportional to the product of the currents $i_1$ and $i_2$. Accordingly, the output current of the circuit is proportional to the product of the two input circuits.

The multiplier illustrated by FIGURES 5*a* and 5*b* at a carrier frequency of 50 kc. can accommodate input currents up to 1 ma. maximum over a frequency range from 0 to 20 kc. with a linearity within $\pm\frac{1}{3}\%$ from $+70°$ C. to $-50°$ C. Special selection of transistors or diodes is not required.

The multiplier has been described as using a source of square wave carrier frequency $f_0$ because with a square wave carrier frequency linear operation is obtained. However, if it is desired to use the multiplier to obtain non-linear multiplication, then other waveforms may be used; for example, if the carrier frequency is a sine wave then the output current is proportional to $a.\cos\phi$, where $\phi$ is the phase-angle dependent on the amplitude of one of the input currents, and $a$ is the amplitude of the other input current. The preferred form of the invention shown in the drawings uses current input signals but other types of signals could be used; for example, voltage signals. The phase-sensitive detector and the suppressed-carrier amplitude modulator, shown in the drawings, have been shown as diode rings but other types may be used; for example, the switching functions of the diode ring in the phase-sensitive detector could be performed, as is well known, by relays, although in this case the maximum speed of operation would be less. Also, an electron tube phase-sensitive detector could be substituted for the diode ring and would be adapted to voltage input signals.

What we claim as our invention is:

1. An analogue multiplier having input connections for an electric current corresponding to a multiplicand, input connections for an electric current corresponding to a multiplier and output connections for an electric current corresponding to the product of the multiplicand and the multiplier; said apparatus comprising phase-sensitive detector means having first and second input connections and an output connection, said phase-sensitive detector means being adapted to provide at its output connections an electric current having a predetermined relationship to the product of the phase difference between the electric signals at its input connections and the amplitude of one of the electric signals at its input connections, a source of a single square wave carrier signal, a phase modulator adapted to phase-modulate said single square wave carrier signal according to variations of said electric current corresponding to a multiplicand, means adapted to shift the phase of the phase-modulated carrier signal by 90° and to supply the phase-shifted phase-modulated carrier signal to one input connection of said phase-sensitive detector means, a suppressed-carrier amplitude modulator adapted to amplitude-modulate said single square wave carrier signal according to variations of said electric current corresponding to a multiplier and to supply the amplitude-modulated carrier signal to the other input connection of said phase-sensitive detector means, so that a current is obtained at the output connections of said phase-sensitive detector means in a predetermined relationship to the product of the input currents of said apparatus.

2. Apparatus as claimed in claim 1 in which the phase modulator comprises the single diode ring adapted to amplitude-modulate a square wave carrier signal from the source of carrier signal by the current corresponding to a multiplicand, integrator means adapted to convert the single square wave carrier signal from the source of carrier signal to a triangular wave signal, adder means adapted to combine the modulated signal from the diode ring of the phase modulator with said triangular wave signal and means adapted to produce a phase-modulated square wave signal from the combined signal from the adder means.

References Cited in the file of this patent

"Two New Electronic Analog Multipliers," Meyer et al. "The Review of Scientific Instruments," vol. 25, December 1954, p. 1166–1172 relied on.

"An Electronic Analog Multiplier Using Carriers," Weibel, "I.R.E. Transactions on Electronic Computers," March 1957. Pages 30–33 relied on.